US011798427B2

(12) United States Patent
Evans et al.

(10) Patent No.: US 11,798,427 B2
(45) Date of Patent: Oct. 24, 2023

(54) AUTO-LABELING SENSOR DATA FOR MACHINE LEARNING

(71) Applicant: The Boeing Company, Chicago, IL (US)

(72) Inventors: Nick S. Evans, Lynnwood, WA (US); Eric R. Muir, Bothell, WA (US); Tyler C. Staudinger, Parker, CO (US); Michelle D. Warren, Seattle, WA (US)

(73) Assignee: The Boeing Company, Chicago, IL (US)

( * ) Notice: Subject to any disclaimer, the term of this patent is extended or adjusted under 35 U.S.C. 154(b) by 72 days.

(21) Appl. No.: 17/552,138

(22) Filed: Dec. 15, 2021

(65) Prior Publication Data

US 2022/0238031 A1 Jul. 28, 2022

Related U.S. Application Data

(60) Provisional application No. 63/141,422, filed on Jan. 25, 2021.

(51) Int. Cl.
*G08G 5/00* (2006.01)
*B64C 39/02* (2023.01)
(Continued)

(52) U.S. Cl.
CPC .......... *G08G 5/045* (2013.01); *B64C 39/024* (2013.01); *G06F 18/2155* (2023.01); *G06V 20/17* (2022.01); *B64U 2101/30* (2023.01)

(58) Field of Classification Search
CPC .... G08G 5/045; G08G 5/0008; G08G 5/0021; G08G 5/0078; G08G 5/00; B64C 39/024;
(Continued)

(56) References Cited

U.S. PATENT DOCUMENTS 4,267,562 A * 5/1981 Raimondi ............... F41G 7/343
348/284
8,924,069 B1 * 12/2014 Kaneshige ............... G05D 1/12
701/25
(Continued)

FOREIGN PATENT DOCUMENTS

WO WO-2021016148 A1 * 1/2021 ............. A01K 29/00
WO WO-2021138441 A1 * 7/2021 ........... G05D 1/0094
WO WO-2022094279 A1 * 5/2022 ......... G02B 27/0172

*Primary Examiner* — Yonel Beaulieu
(74) *Attorney, Agent, or Firm* — Jordan IP Law, LLC

(57) ABSTRACT

Solutions are provided for auto-labeling sensor data for machine learning (ML). An example includes: determining a platform's own position; recording, from a sensor aboard the platform, sensor data comprising a sensor image; receiving position data for at least one intruder object (e.g., a nearby airborne object); based at least on the position data for the intruder object and the platform's position, determining a relative position and a relative velocity of the intruder object; based at least on the relative position and a relative velocity of the intruder object and a field of view of the sensor, determining an expected position of the intruder object in the sensor image; labeling the sensor image, wherein the labeling comprises annotating the sensor image with a region of interest and an object identification; and training an artificial intelligence (AI) model using the labeled sensor image.

22 Claims, 11 Drawing Sheets

(51) Int. Cl.
 *G06V 20/17* (2022.01)
 *G08G 5/04* (2006.01)
 *G06F 18/214* (2023.01)
 *B64U 101/30* (2023.01)

(58) Field of Classification Search
 CPC ..... B64C 39/02; G06F 18/2155; G06V 20/17; G06V 10/25; G06V 10/774; G06V 10/82; B64U 2101/30; B64U 2201/10
 See application file for complete search history.

(56) References Cited

U.S. PATENT DOCUMENTS

| | | | |
|---|---|---|---|
| 11,500,056 B2 * | 11/2022 | Wu | G01S 5/06 |
| 2004/0061641 A1 * | 4/2004 | Fischer | G01S 13/723 |
| | | | 342/55 |
| 2017/0069214 A1 * | 3/2017 | Dupray | G08G 5/0008 |
| 2018/0067502 A1 * | 3/2018 | Chi-Hsueh | B64D 47/08 |
| 2019/0197402 A1 * | 6/2019 | Kovács | G06N 3/045 |
| 2023/0007439 A1 * | 1/2023 | Williams | A61B 5/7275 |
| 2023/0058389 A1 * | 2/2023 | Kaveny | B25J 13/006 |
| 2023/0113472 A1 * | 4/2023 | Gallery | G02B 27/017 |
| | | | 463/5 |

* cited by examiner

AUTO-LABELING SENSOR DATA FOR MACHINE LEARNING

CROSS-REFERENCE TO RELATED APPLICATION

This application claims the benefit of and priority to U.S. Provisional Application No. 63/141,422, entitled "AUTO-LABELING SENSOR DATA FOR MACHINE LEARNING", filed Jan. 25, 2021, which is incorporated by reference herein in its entirety.

BACKGROUND

Autonomous collision avoidance (including "remain well clear" requirements) for autonomous unmanned aerial vehicles (UAVs) often relies on artificial intelligence (AI), for example, using machine vision (MV) to identify other airborne objects that are intruding into the vicinity (e.g., intruder objects). An intruder object may be some object or entity entering a "field of regard," which is a three-dimensional (3D) volume that the intruder object may occupy. A field of regard is used for trajectory planning. AI components used for such tasks require training with high-quality data sets in order to provide reliable performance, and the volume of training data needed is typically large. Unfortunately, the per-unit cost associated with providing high-quality training data sets, coupled with the volume needed, may significantly drive up the cost of training material.

Although the sensor data, containing sensor images of intruder objects (which may be airborne or nearby on the ground, such as a taxiway), may be obtained in a cost-effective manner, the primary cost driver may be ensuring that the sensor images are properly labeled. Labeling sensor images to be used as training data, at a rate of only 15 seconds per image, may reach a staggering level of effort when the number of images reaches into the millions.

SUMMARY

The disclosed examples are described in detail below with reference to the accompanying drawing figures listed below. The following summary is provided to illustrate implementations disclosed herein. It is not meant, however, to limit all examples to any particular configuration or sequence of operations.

Solutions are provided for auto-labeling sensor data for machine learning (ML). An example includes: determining, a platform's own position (ownship data); recording, from an electro-optical sensor aboard the platform, sensor data comprising a sensor image; receiving position data for at least one intruder object; based at least on the position data for the intruder object and the platform's position, determining a relative position and a relative velocity of the intruder object; based at least on the relative position and a relative velocity of the intruder object and a field of view of the sensor, determining an expected position of the intruder object in the sensor image; labeling the sensor image, wherein the labeling comprises annotating the sensor image with a region of interest and an object identification; and training an artificial intelligence (AI) model using the labeled sensor image.

The features, functions, and advantages that have been discussed are achieved independently in various examples or are to be combined in yet other examples, further details of which are seen with reference to the following description and drawings.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
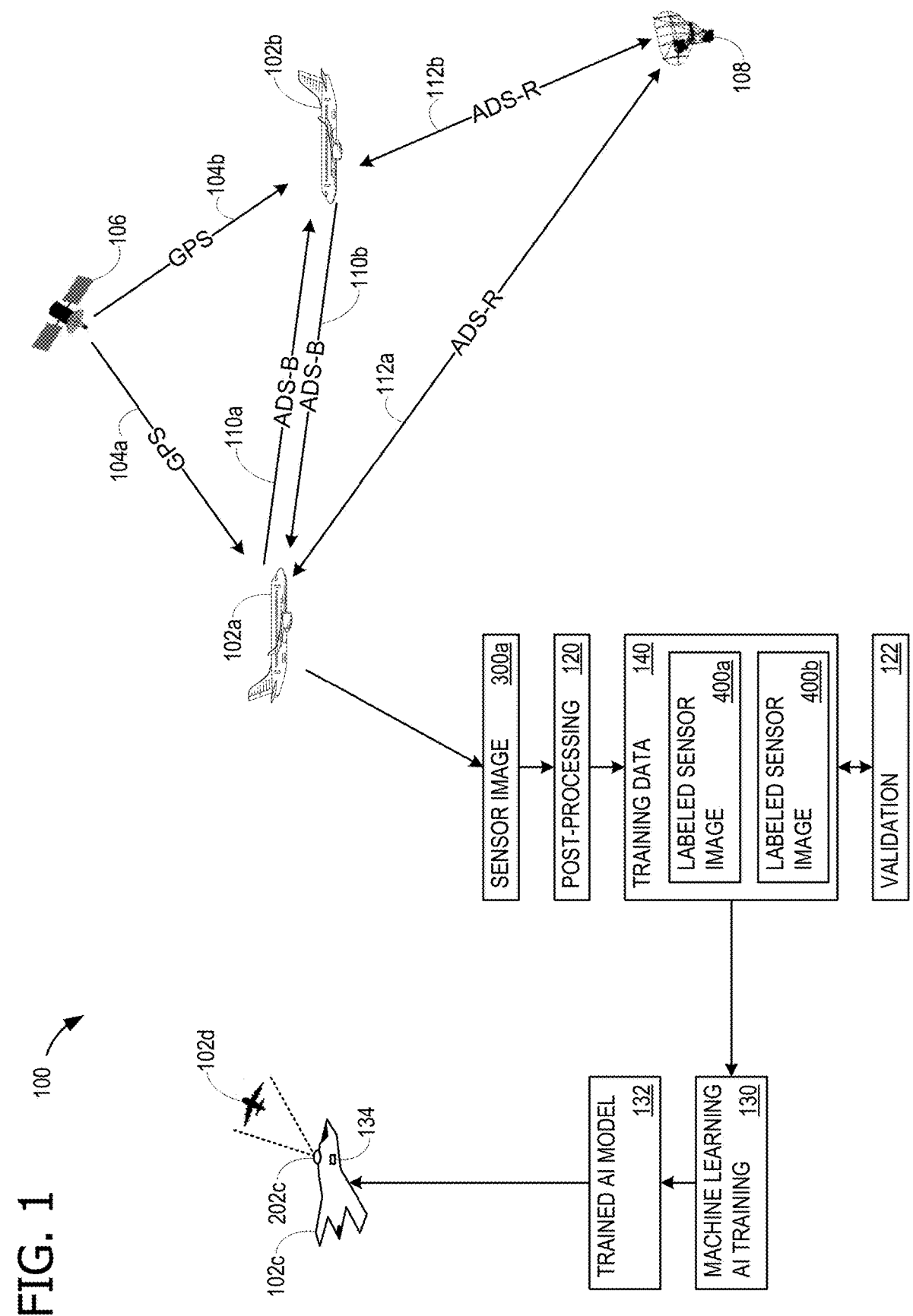
FIG. 1 illustrates an arrangement 100 that advantageously auto-labels sensor data for ML, in accordance with an example.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one implementation" or "one example" are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

Aspects of the disclosure are able to advantageously auto-label sensor data for machine learning (ML), for example to train an artificial intelligence (AI) model that may then be used for autonomous navigation. ML is an application of AI that provides systems with the ability to automatically learn and improve from experience without being explicitly programmed. Autonomous navigation, including collision avoidance, by unmanned aerial vehicles (UAVs) may rely on synthetic vision, often referred to as machine vision (MV) or computer vision (CV), that requires training for identifying nearby objects. Collision avoidance may include more than avoiding striking another object, but instead may include abiding by a requirement to "remain well clear" of other objects. Unsupervised auto-labeling, as disclosed herein, may significantly reduce the per-unit cost associated with providing high-quality training data sets, thereby dropping the cost of providing training material, even in large volumes. In one example, sensor imagery is automatically labeled, using automatic dependent surveillance-broadcast (ADS-B) to identify other aircraft (e.g., airborne intruder objects or intruder objects nearby on a taxiway) in the vicinity of the platform that is hosting the sensors.

With ADS-B, an aircraft determines its position and velocity (e.g., using global position system (GPS) data) and periodically broadcasts it to other aircraft. ADS-B may include aircraft velocity information and identification, such as the tail number and vehicle class. Vehicle class may include indications such as large aircraft, small aircraft, and ultralight. ADS-R is an ADS rebroadcast system, in which a ground station receives the position and velocity from an aircraft and rebroadcasts it for the benefit of other aircraft. When a platform receives an ADS-B or ADS-R signal, it may be used to correlate nearby intruder objects with objects appearing with in the field of view of sensors aboard the platform. The platform can measure its own position (ownship data) with six degrees of freedom (6DOF), including latitude, longitude, altitude, yaw, pitch, and roll. An intruder object may be some object or entity entering a "field of regard," which is a three-dimensional (3D) volume that the intruder object may occupy. A field of regard is used for ownship trajectory planning.

Onboard sensors will have a known field of view, based on the sensors installed positions and orientations (giving a 6DOF translation). The sensor image field of view may be modeled based on the sensor's extrinsic parameters such as position and orientation and intrinsic parameters such as resolution and frustum (the 3D region which is visible to the sensor, often having the shape of a clipped pyramid). Electro-optical sensors may be used, such as optical cameras, infrared cameras, light detection and ranging (LIDAR) sensors, radio detection and ranging (radar), and even acoustical sensors.

Combining the modeled sensor field of view with the relative position of the nearby intruder object enables determination of a region of interest (ROI) within sensor images that are likely to contain a view of the intruder object. The sensor images that are likely to contain a view of the intruder object may then be automatically labeled, for example without requiring a human to label the images, including an annotation of a bounding box and vehicle class of the intruder object. By leveraging ADS-B and/or ADS-R data, the locations and identification of vehicles in sensor data may be automatically labeled for rapid generation of ML training data sets. Aspects of the disclosure present novel solutions in which auto-labeling of sensor data for machine learning enables extremely rapid generation of large data sets that are ready for training, eliminating or reducing the cost of manual labor for annotating data, speeding flowtime for labeling and annotating data, and eliminating or reducing the potential for introducing human error into the labels. These benefits may rapidly accelerate AI implementation in collision avoidance, for both autonomous navigation and supplemental warning systems for plotted aircraft and ground vehicles.

Aspects and examples disclosed herein are directed to solutions for auto-labeling sensor data for ML. An example includes: determining, a platform's position; recording, from an electro-optical sensor aboard the platform, sensor data comprising a sensor image; receiving position data for at least one intruder object; based at least on the position data for the intruder object and the platform's position, determining a relative position and a relative velocity of the intruder object; based at least on the relative position and a relative velocity of the intruder object and a field of view of the sensor, determining an expected position of the intruder object in the sensor image; labeling the sensor image, wherein the labeling comprises annotating the sensor image with a region of interest and an object identification; and training an AI model using the labeled sensor image.

Figure 2:
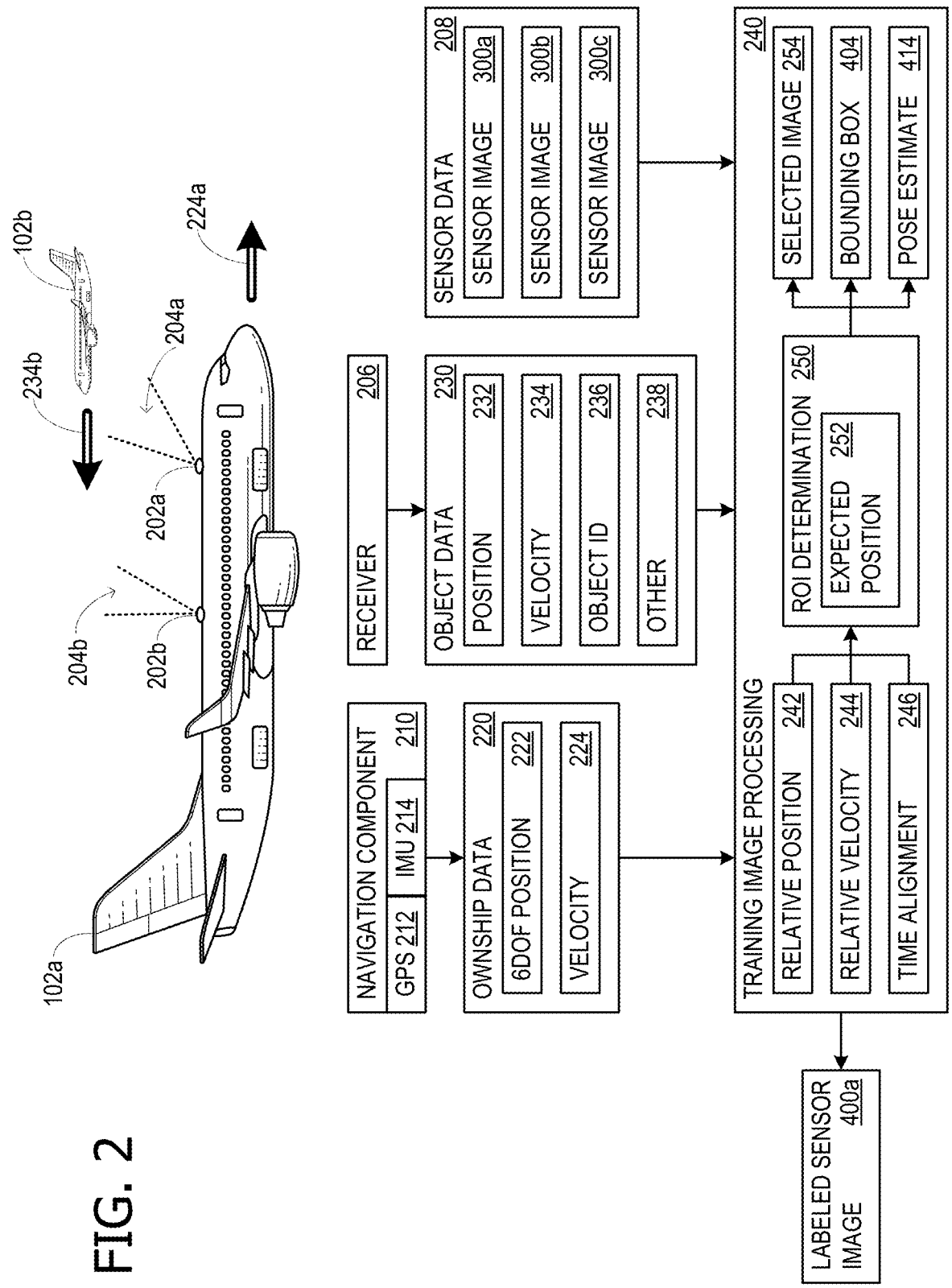
FIG. 2 illustrates further detail for the arrangement 100 of FIG. 1, in accordance with an example.

Referring more particularly to the drawings, FIG. 1 illustrates an arrangement 100 that advantageously auto-labels sensor data for ML, and FIG. 2 illustrates further detail for the arrangement 100. Referring initially to FIG. 1, a platform 102a is collecting sensor data while flying. The platform 102a may be a manifestation of an apparatus 1000 of FIG. 10, more specifically, a flying apparatus 1001, as shown in FIG. 11. An intruder object 102b (which may be airborne or nearby on the ground, such as a taxiway), is intruding into the airspace around the platform 102a and is thus in the vicinity of the platform 102a. The intruder object 102b may also be another flying apparatus 1001. As illustrated, the platform 102a and the intruder object 102b are each navigating using GPS. That is, the platform 102a receives GPS signals 104a from a satellite 106, and the intruder object 102b receives GPS signals 104b from the satellite 106. In one example, the satellite 106 is a manifestation of the apparatus 1000 of FIG. 10.

The platform 102a determines its own position data and velocity data using a GPS receiver 212, an inertial measurement unit (IMU) 214, and/or another navigation aid. (See FIG. 2.) Platform 102a calculating its own position is part of determining its ownship data 220 (also shown in FIG. 2). In one example, the platform ownship data 220 is based at least on GPS data from the GPS receiver 212. In one example, the platform ownship data 220 is based at least on IMU data from the IMU 214. In one example, the platform ownship data 220 6DOF, for example 3D position, latitude, longitude, and altitude, and 3D orientation, yaw, pitch, and roll. The platform 102a transmits at least some of its ownship data 220, which is received by the intruder object 102b and also a ground station 108. In one example, the transmission to the intruder object 102b is an ADS-B signal 110a.

The intruder object 102b is similarly equipped to determine and transmit its own position data 232 and velocity data 234, which are received by the platform 102a, for example as an ADS-B signal 110b, and the ground station 108. (See FIG. 2) In one example, the ground station relays the position data 222 or 232 and the velocity data 224 or 234, received from each of the platform 102a and the intruder object 102b, to the other as ADS-R signal 112a and ADS-R signal 112b. Thus, in one example, the position data 232 for the intruder object 102b comprises ADS-B data and is received from the intruder object 102b. In one example, the position data 232 for the intruder object 102b is received from the ground station 108. In one example, the position data 232 for the intruder object is received from another intruder object that is relaying received ADS-B signals. In one example, the velocity data 234 is not received, but is instead determined (calculated), using subsequent values of the position data 232 and the time between those reports.

The platform 102a produces and offloads a sensor image 300a (along with other sensor images), which may already be labeled or for which labeling may yet to be accomplished, using the received position data 232 and velocity data 234 for the intruder object 102b. A post-processing component 120 performs post-processing on the sensor image 300a, and the sensor image 300a is stored in training data 140 as labeled sensor image 400a. Other labeled sensor images, for example labeled sensor image 400b, are also stored in the training data 140. In one example, the training data 140 is validated by a validation component 122 prior to being used for training. Post-processing and validation are described in further detail in relation to FIG. 5.

An ML/AI training component 130 uses the training data 140 to train a trained AI model 132, which is deployed to a UAV 102c aboard an autonomous navigation component 134. In one example, the trained AI model 132 comprises a neural network. In one example, the trained AI model 132 comprises a convolutional neural network (CNN). In one example, the UAV 102c is another flying apparatus 1001. The UAV 102c autonomously navigates using the trained AI model 102 in combination with a sensor 202c aboard the UAV 102c. The autonomous navigation comprises collision avoidance, for example avoiding a second intruder object 102d (which may be yet another flying apparatus 1001).

Turning now to FIG. 2, the platform 102a hosts an electro-optical sensor 202a, having a field of view 204a, and another electro-optical sensor 202b, having a field of view 204. Thus, there is a plurality of sensors (at least sensor 202a and 202b) aboard the platform 102a. In one example, the sensors 202a and 202b each comprises a sensor type selected from the list consisting of: an optical camera, a LIDAR sensor, an infrared sensor, and a radar. Although two sensors are illustrated, it should be understood that a different number may be used, and they may be oriented differently than as shown. The platform 102a has a velocity vector 224a, which may be broken into three components when represented in the velocity data 224. For example, the velocity vector 224a may be represented in the velocity data 224 as an east/west speed, a north/south speed, and an altitude rate of change. Similarly, the intruder object 102b has a velocity vector 234b, which may be broken into three components when represented in the velocity data 234. For example, the velocity vector 234ba may be represented in the velocity data 234 as an east/west speed, a north/south speed, and an altitude rate of change.

The platform 102a has a navigation component 210, which includes at least the GPS receiver 212 and the IMU 214 and provides the platform ownship data 220. As illustrated, the platform ownship data 220 includes both the position data 222 and the velocity data 224, although some definitions of ownship data may include only position and exclude velocity. The platform 102a also has a receiver 206 that receives object data 230, for example from the ADS-B signal 110a and/or the ADS-R signal 112a. The object data 230 includes the position data 232 and the velocity data 234 for the intruder object 102b. The object data 230 also includes an object identifier (ID) 236 and other object data 238. For example, ADS-B data may include GPS position, altitude, east/west speed, north/south speed, altitude rate of change, a containment radius (position uncertainty, reported as +/−meters from the reported position), the category of aircraft (size, weight, type), deviation info, an International Civil Aviation Organization (ICAO) address (a specific address given to each aircraft), and a call sign for a given aircraft (e.g., a tail number). In one example, sensor data 208 includes the recording of ADS-B data images collected from the sensors 202a and 202b, for example sensor images 300a, 300b, and 300c.

Figure 3:
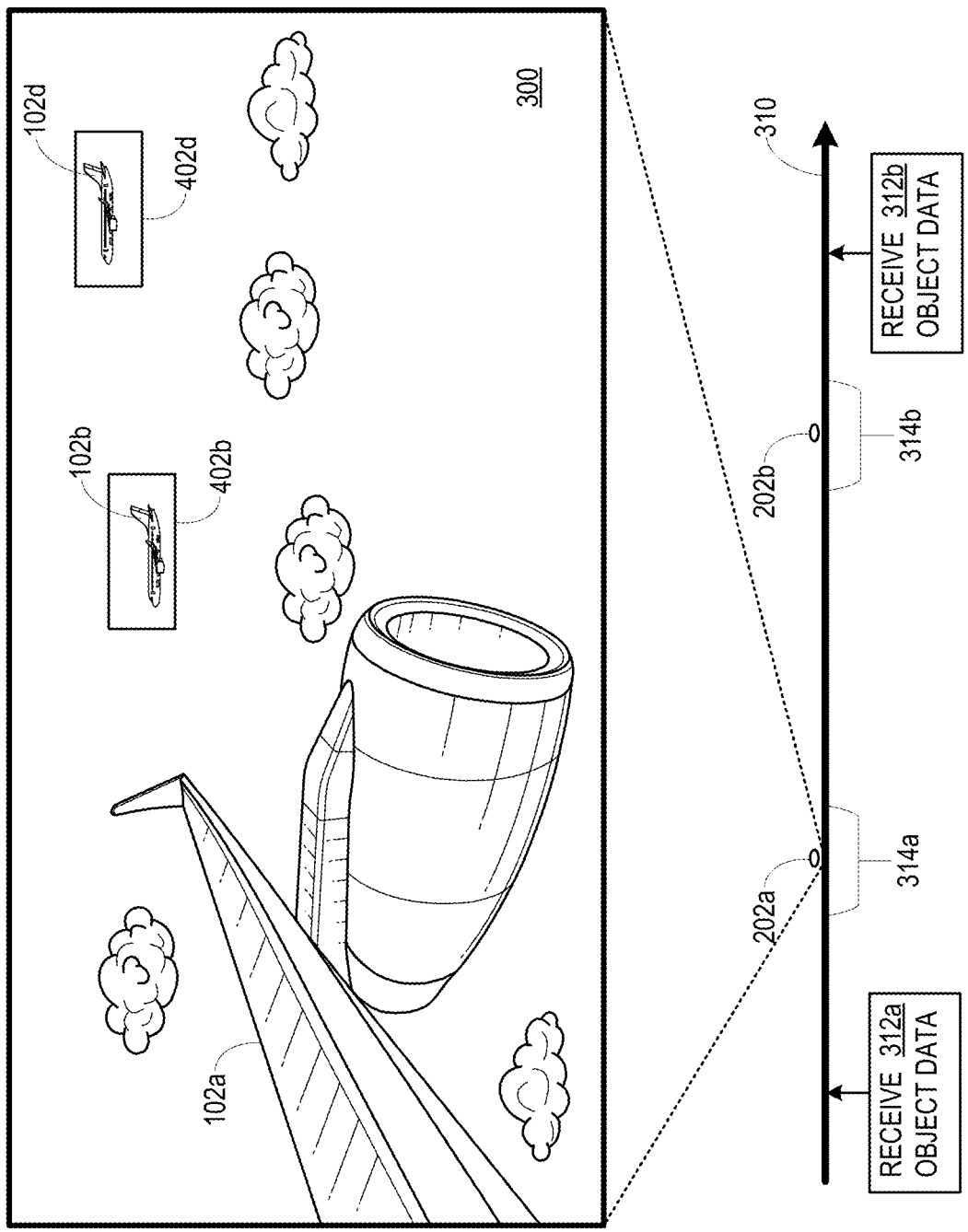
FIG. 3 illustrates an exemplary sensor image 300, on a timeline 310, such as may be generated in the arrangement 100 of FIG. 1, in accordance with an example.

A training image processing component 240 is operable to determine a relative position 242 and a relative velocity 244 of the intruder object 102b relative to the platform 102a, using the position data 222 the velocity data 224, the position data 232, and the velocity data 234. In one example, the training image processing component 240 is hosted on a computing device 800 of FIG. 8. The relative position 242 and a relative velocity 244 may have an associated accuracy, producing some uncertainty, as will be explained in further detail in relation to FIG. 4. In one example, the relative velocity 244 is determined using interpolation of subsequently-determined positions and timing data, rather than directly from received velocity information (e.g., the velocity data 234). Using the relative position 242 and a relative velocity 244, along with the orientations and fields of view 204a and 204b of the sensors 202a and 202b, respectively, a time alignment component 246 is operable to determine which of the sensors 202a and 202b has a view of the intruder object 102b in a time interval (e.g., time interval 314a or 314b, as shown in FIG. 3) that corresponding to one of the sensor images 300a, 300b, and 300c. The corresponding one of sensor images 300a, 300b, and 300c is selected image 254.

The time alignment component 246 is further operable to determine an expected position 252 of the intruder object 102b in the selected image 254 for the time interval (e.g., time interval 314a or 314b) using a region of interest determination component 250. In one example, the sensor images 300a, 300b, and 300c are timestamped using GPS-sourced time and time alignment component 246 also references GPS-sourced time. Time alignment is described in further detail in relation to FIG. 3. The training image processing component 240 labels the selected image 254 by at least annotating the selected image 254 with a region of interest that may be coincident with a bounding box 404 and the object ID 236. In one example, the bounding box 404 depends on a pose estimate 414. This generates the labeled sensor image 400a, which is described in further detail in relation to FIG. 4. In one example, the labeling may also include at least some of the other object data 238. In one example, the training image processing component 240 is aboard the platform 102a. In one example, the sensor data 208 is offloaded and the training image processing component 240 is located elsewhere.

FIG. 3 illustrates an exemplary sensor image 300, on a timeline 310, such as may be generated in the arrangement 100 of FIG. 1. The sensor image is an example of what may be the sensor image 300a of FIGS. 1 and 2. Within the sensor image 300 is shown a portion of the platform 102a, the intruder object 102b and the second intruder object 102d. A region of interest 402b surrounds the intruder object 102b, and a region of interest 402d surrounds the intruder object 102d. As illustrated, one example of the training image processing component 240 of FIG. 2 is able to handle correlation of sensor images with multiple intruder objects.

The timeline 310 provides an illustration of time alignment activities. The ADS-B signal 110b may be received infrequently and is unlikely to coincide exactly with the collection of the sensor image 300. As illustrated, ADS-B signal 110b is received at two reception events, specifically a first reception event 312a and a second reception event 312b. After the reception event 312a, but prior to the reception event 312b, the sensors 202a and 202b aboard the platform 102a collect images during multiple time intervals, specifically during a first-time interval 314a and a second time interval 314b. With the time delay between the reception events 312a and 312b, the intruder object 102b may have moved a significant distance. In some scenarios, the intruder object 102b may be within the field of view 204a of the sensor 202a during the time interval 314a, but already have moved out of the field of view 204a of the sensor 202a by the time interval 314b.

Therefore, the training image processing component 240 determines which sensor 202a or 202b has a view of the intruder object 102b in each of the time intervals 314a and 314b, based at least on the relative position 242 and the relative velocity 244 of the intruder object 102b and the fields of view 204a and 204b of the sensors 202a and 202b. As illustrated, the training image processing component 240 determines that the sensor 202a has a view of the intruder object 102b in the time intervals 314a and predicts that the sensor 202b will have a view of the intruder object 102b in the time intervals 314b. The training image processing component 240 also determines an expected position of the intruder object 102b in the sensor image (e.g., the sensor image 300) for a time interval (e.g., the time interval 314a) corresponding to the sensor image, based at least on the relative position 242 and the relative velocity 244 of the intruder object 102b and the field of view 204a of the sensor 202a.

The sensor image 300 becomes the selected image 254 of FIG. 2. Referring briefly back to FIG. 2, the training image processing component 240 will then label the selected image 254 (e.g., a sensor image), wherein the labeling comprises annotating the selected image 254 with the region of interest 402b and the object ID 236. In one example, labeling the selected image 254 comprises annotating the selected image 254 with a region of interest 402b and the object ID 236 and may also include at least some of the other object data 238.

Figure 4:
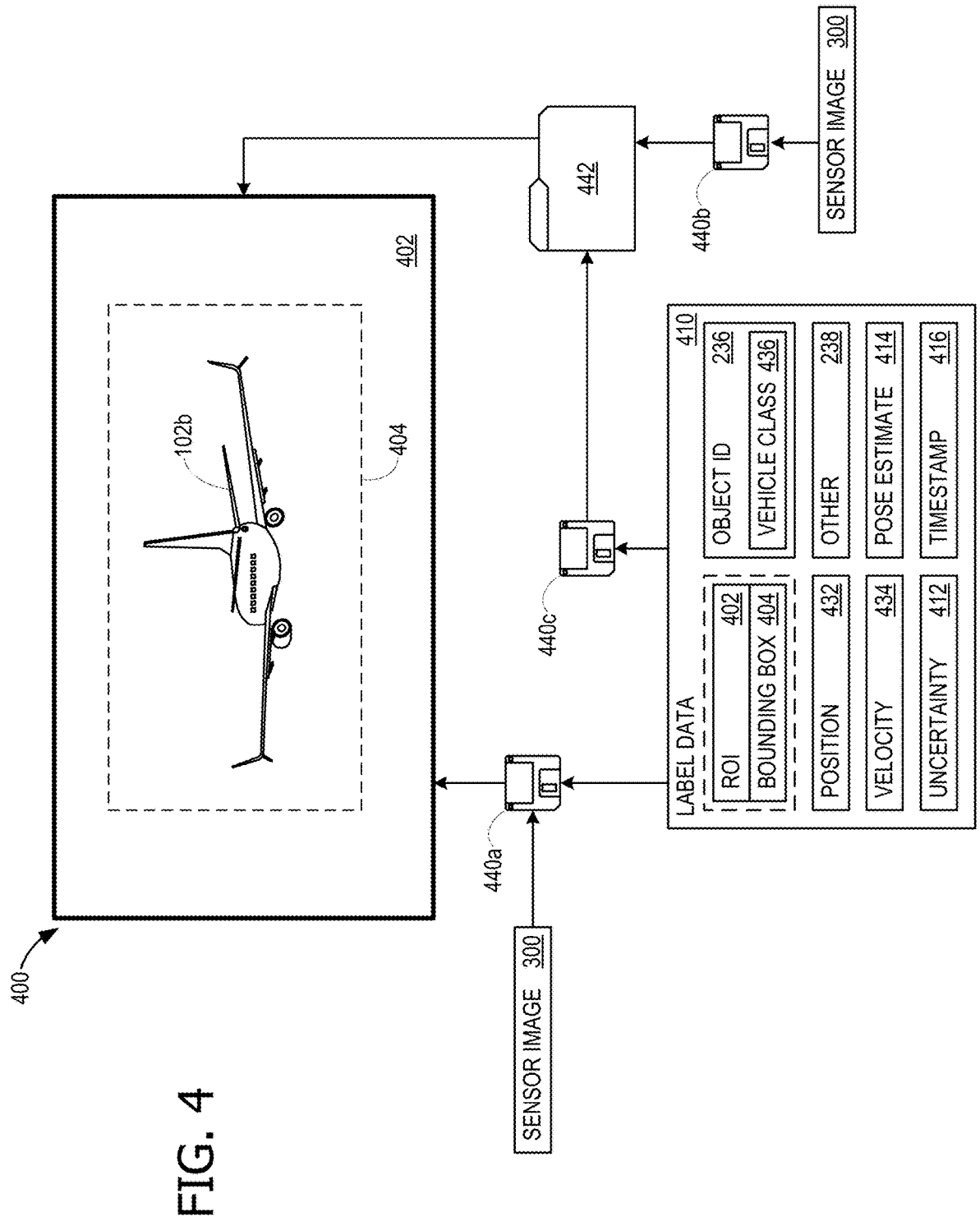
FIG. 4 shows an exemplary labeled sensor image 400, such as may be generated in the arrangement 100 of FIG. 1, in accordance with an example.

FIG. 4 shows an exemplary labeled sensor image 400, which is an example of what may be the labeled sensor image 400a or 400b of FIG. 1. The labeled sensor image 400 shows a region of interest 402 (abbreviated as ROI) and a bounding box 404. In one example, the bounding box 404 defines the region of interest 402. In one example, the region of interest 402 is a 3D volume, and the bounding box 404 is the two-dimensional (2D) projection of the 3D region of interest 402 in the labeled sensor image 400. In one example (as illustrated), the bounding box 404 may define an area within the region of interest 402, and slightly smaller. In one example, the bounding box 404 is specified as a center pixel, a height, and a width.

Label data 410 may include a definition of the region of interest 402 and/or the bounding box 404, position data 432, velocity data 434, uncertainty 412, the object ID 236, other object data 238, a pose estimate 414, and a timestamp 416. The position data 432 is the position of the intruder object 102b within the labeled sensor image 400. The velocity data 434 may be useful in sensor images in which motion of the intruder object 102b affects image collection, such as occurs when images are blurred or Doppler shifts occur with radar and sonar. As indicated, the object ID 236 includes a vehicle class 436. In one example, the timestamp 416 in the label data 410 is derived from GPS timing (for example from the GPS receiver 212 of FIG. 2). The other object data 238 is used to label the labeled sensor image 400 with all other relevant and determinable information about the intruder object 102b and the image collection operation.

An uncertainty 412 reflects the limits of the accuracy of the calculations of the relative position 242 and a relative velocity 244 from the position data 222 and 232 and the velocity data 224 and 234. The uncertainty 412 is used to expand and contract the uncertainty of the true spatial location of the intruder object 102b within the labeled sensor image 400, for example determining a size of the region of interest 402 (and/or the bounding box 404) within the labeled sensor image 400. In one example, the auto-labelling process described herein will dynamically resize and expand/contract proportionally with intruder ADS-B uncertainty.

Other factors affecting the size of the region of interest 402 and/or the bounding box 404 include the distance to the intruder object 102b (which is determinable from the relative position 242 of FIG. 2), the vehicle class 436, and the pose estimate 414. The vehicle class 436 will indicate the physical dimensions of the intruder object 102b, and the pose estimate 414 will indicate the projection of the physical dimensions of the intruder object 102b as seen by the sensor 202a or 202b. In one example, the pose estimate 414 is derived from the relative velocity 244, for example from a unit vector pointing in the direction of the relative velocity 244. Combining the distance, physical size (which may be looked up in a vehicle class database), 2D projection, position uncertainty, and sensor resolution enables a determination of the number of pixels across which the intruder object 102b may extend within the within the labeled sensor image 400. This is used to define the bounding box 404, which may then define the region of interest 402 (or the region of interest 402 may extend beyond the bounding box 404).

As indicated in FIG. 4, multiple options exist for labeling the labeling the labeled sensor image 400. One option includes annotating a digital file 440a comprising the sensor image 300 with the label data 410 to become the labeled sensor image 400. Another option includes storing the sensor image 300 as a digital file 440b and the label data 410 in a separate digital file 440c, possibly along with label data for other sensor images, and associating the label data 410 with metadata for the digital file 440b (e.g., the sensor image 300 as stored) in a storage solution 442. The combination of the digital files 440b and 440c, along with the association then becomes labeled sensor image 400.

Figure 5:
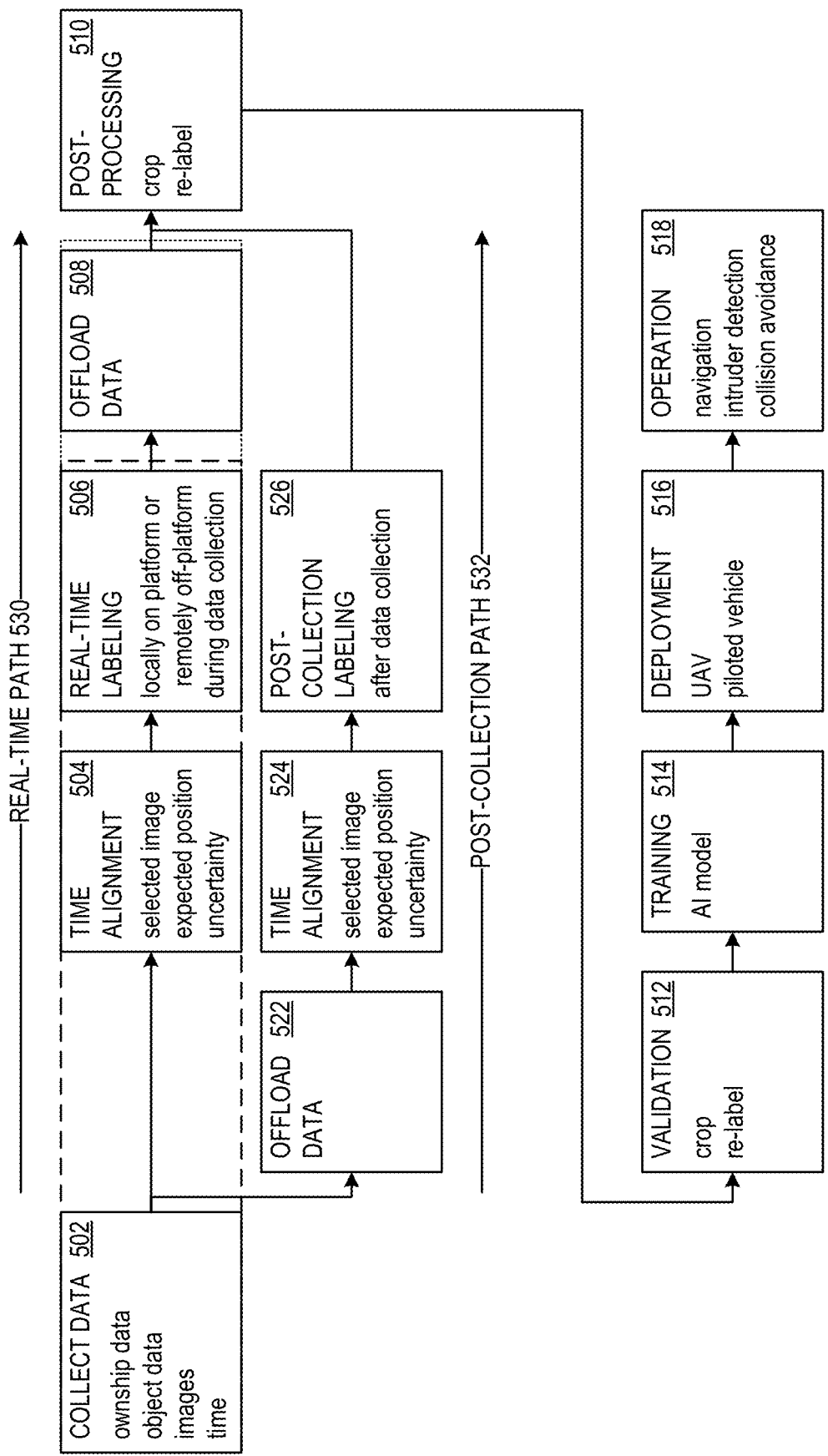
FIG. 5 illustrates data flow for an exemplary process 500 that may be used with the arrangement 100 of FIG. 1, in accordance with an example.

FIG. 5 illustrates data flow for an exemplary process 500 that may be used for the auto-labelling described herein. As indicated in FIG. 5, there are some options with regards to when the labeling occurs, such as in real-time or post-collection. A collect data operation 502 collects the sensor data 208 of FIG. 3. For a real-time path 530, a time-alignment operation 504 performs the alignment between the reception events 312a and 312b and the sensor image collection time intervals 314a and 314b. A real-time labeling operation 506 occurs either locally on the platform 102a or remotely off the platform, but during operation 502. That is, operations 504 and 506 occur during operation 502. The labeled sensor images 400a and 400b are then offloaded from the platform 102a during an offload data operation 508, for implementations that perform on-platform real-time labeling. For implementations that perform off-platform real-time labeling (e.g., the training image processing component 240 is not aboard the platform 102a), operation 508 also occurs simultaneously with operation 502, so that labeling may occur remotely during. Such an implementation may be preferred if the platform is a light-weight aircraft without sufficient weigh-carrying capacity to carry the computational resources necessary to perform real-time labeling.

In contrast, for a post-collection path 532, an offload data operation 522 occurs after the completion of operation 502, a time-alignment process 524 performs the alignment between a recording of the reception events 312a and 312b and the sensor image collection time intervals 314a and 314b (as defined by the timestamp 416). A post-collection labeling operation 526 then occurs.

A post-processing operation 510, performed by the post-processing component 120, may further refine the label data 410 and other aspects of the labeled sensor images 400a and 400b. Post-processing operation 510 may include, for example, cropping the labeled sensor image 400a or 400b to the region of interest 402 and/or relabeling the labeled sensor image 400a or 400b. A validation operation 512, validating the labeled sensor image 400a or 400b, may occur prior to training the AI model. Training occurs in a training operation 514 to produce the trained AI model 132. A deployment operation 516 deploys the trained AI model 132 to the UAV 102c and/or a piloted aircraft. During operations 518, the trained AI model 132 assists with autonomous navigation for the UAV 102c, for example by performing intruder detection to enable collision avoidance (thereby avoiding a collision with the intruder object 102d) or performs intruder detection as part of an alert system for a piloted aircraft.

Figure 6:
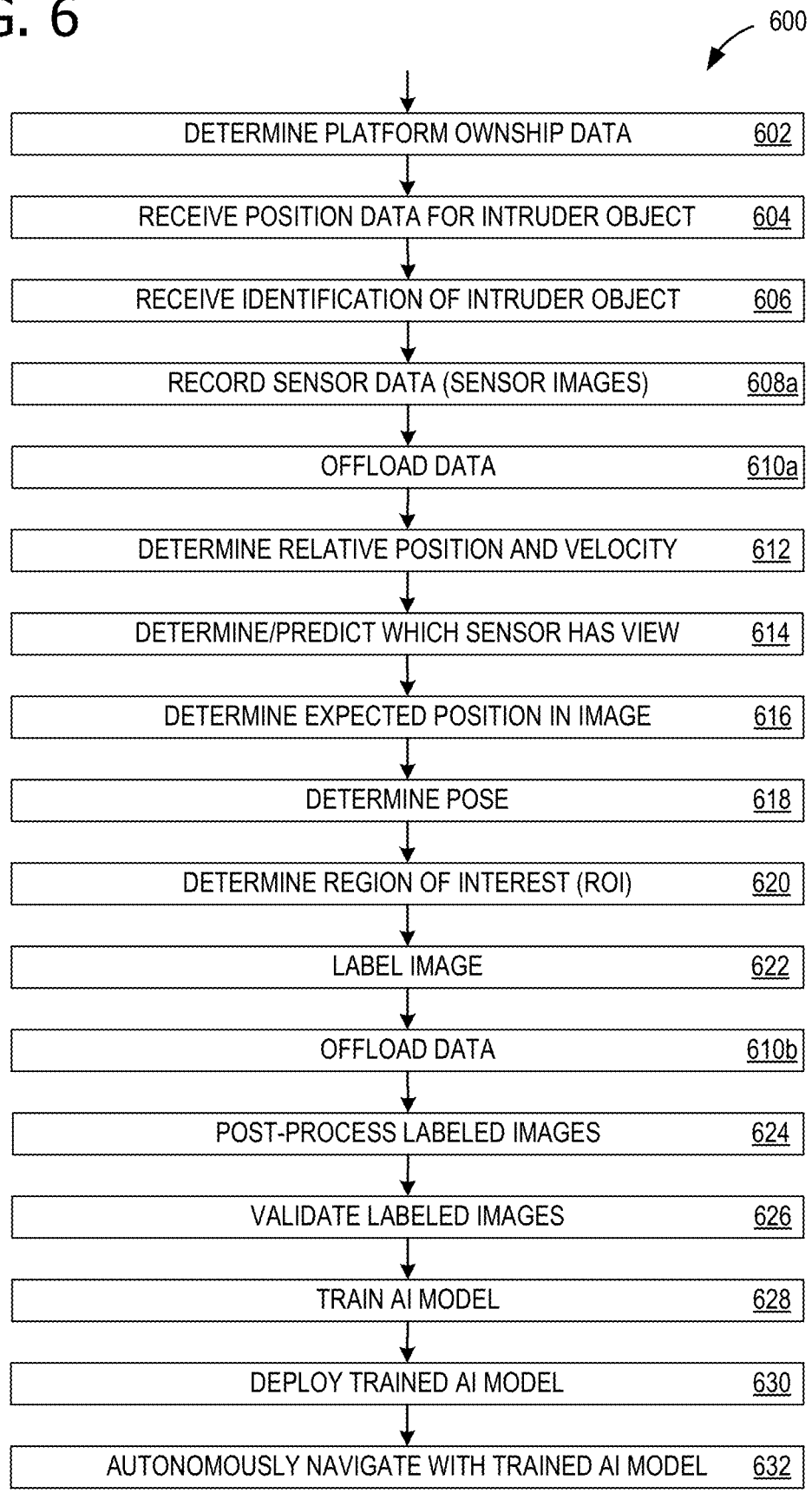
FIG. 6 is a flow chart 600 illustrating a method of auto-labeling sensor data for machine learning, as may be used with the arrangement 100 of FIG. 1, in accordance with an example.

With reference now to FIG. 6, a flow chart 600 illustrates a method of auto-labeling sensor data for ML. In one example, the operations illustrated in FIG. 6 are performed, at least in part, by executing instructions 802a (stored in the memory 802) by the one or more processors 804 of the computing device 800 of FIG. 8. For example, the trained AI model 132 may be trained on a first implementation of the computing device 800 and then deployed on the UAV 102c on a second (different) implementation of the computing device 800 for intruder detection operations. Operation 602 includes determining, for a platform, platform ownship data and, in some examples, platform velocity data. In one example, the platform ownship data has 6DOF. In one example, determining platform ownship data is based at least on GPS data. In one example, determining platform ownship data is based at least on IMU data.

Operation 604 includes receiving position data and, in some examples, velocity data for at least one intruder object. In one example, the position data for the intruder object comprises ADS-B data. In one example, the position data for the intruder object is received from the intruder object. In one example, the position data for the intruder object comprises ADS-R data. In one example, the position data for the intruder object is received from a ground station. In one example, the position data for the intruder object is received from another intruder object. Operation 606 includes receiving an object identification for the intruder object. In one example, the object identification includes a vehicle class. Operation 608 includes recording, from an electro-optical sensor aboard the platform, sensor data comprising a sensor image. In one example, the platform has a plurality of sensors, so operation 608 includes recording, from a plurality of electro-optical sensors aboard the platform, sensor data comprising a plurality of sensor images. In one example, the sensor (or each sensor of the plurality of sensors) comprises a sensor type selected from the list consisting of: an optical camera, a LIDAR sensor, an infrared sensor, and a radar.

For post-collection processing and real-time off-platform processing, the data (sensor data, ownship data, and intruder object data) is offloaded from the platform at 610a. For real-time on-platform processing, the data will be offloaded later, at 610b. Operation 612 includes, based at least on the position data and velocity data for the intruder object and the platform ownship data and platform velocity data, determining a relative position and a relative velocity of the intruder object relative to the platform. Operation 614 provides time alignment and includes, based at least on the intruder object's relative position and relative velocity, determining which sensor of the plurality of sensors has a view of the intruder object in the time interval. In one example, operation 614 includes, based at least on the intruder object's relative position and relative velocity, predicting which sensor of the plurality of sensors will have a view of the intruder object in a second time interval. Operation 616 includes based at least on the relative position and a relative velocity of the intruder object and a field of view of the sensor, determining an expected position of the intruder object in the sensor image for a time interval corresponding to the sensor image.

At this point, there is time alignment between position data for the intruder object and the sensor data (sensor images), including an expected position of the intruder object within one or more sensor images. Operation 618 includes determining a pose of the intruder object and/or determining a projected size of the intruder object based at least on the pose and a size of the intruder object. Operation 620 includes determining a region of interest, for example a region of interest within the sensor image that is determined to have an image of the intruder object. In one example, determining the region of interest comprises, based at least on a distance from the platform to the intruder object, determining a bounding box within the sensor image. In one example, determining the region of interest comprises, based at least on a size of the intruder object (as seen by the sensor according to the pose), determining a bounding box within the sensor image. In one example, determining the region of interest comprises, based at least on a resolution of the sensor, determining a bounding box within the sensor image. In one example, determining the region of interest comprises, based at least on accuracy of the ownship data and accuracy of the position data and velocity data for the intruder object, determining a size of the region of interest within the sensor image.

Operation 622 includes labeling the sensor image, wherein the labeling comprises annotating the sensor image with a region of interest and an object identification. In one example, labeling the sensor image comprises annotating a digital file comprising the sensor image. In one example, labeling the sensor image comprises associating label data with metadata for the sensor image. In one example, labeling the sensor image comprises annotating the sensor image with a pose of the intruder object. In one example, labeling the sensor image comprises timestamping the sensor image. At 610b, data is offloaded from the platform, if it had not already been offloaded at 610a.

Operation 624 includes post-processing the labeled sensor images, for example having a human or another process ensure accuracy of the labeling. In one example, operation 624 includes cropping the labeled sensor image to the region of interest as part of a post-processing operation. In one example, operation 624 includes, based at least on post-processing the labeled sensor image, relabeling the labeled sensor image. Operation 626 includes, prior to training an AI model, validating the labeled sensor image. Operation 628 includes training the AI model using the labeled sensor image. In one example, the AI model comprises a neural network. In one example, the AI model comprises a CNN. Operation 630 includes deploying the trained AI model.

Operation 632 includes autonomously navigating a UAV using the trained AI model in combination with a second sensor aboard the UAV, wherein the autonomously navigation comprises collision avoidance. In one example, operation 632 includes autonomously navigating the UAV using the trained AI model in combination with a second sensor aboard the UAV and position data for a second intruder object, wherein the autonomously navigation comprises collision avoidance.

Figure 7:
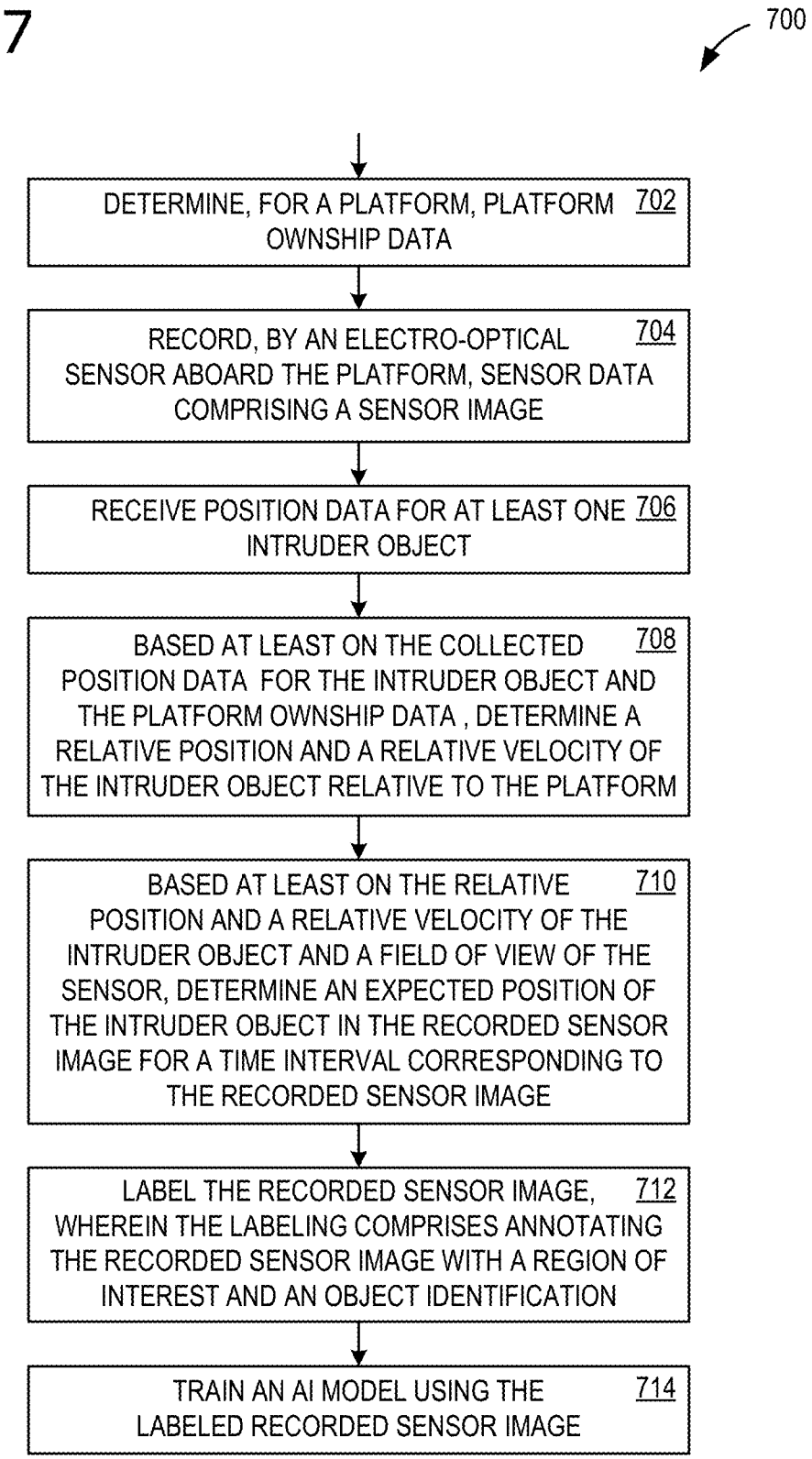
FIG. 7 is a flow chart 700 illustrating another method of auto-labeling sensor data for machine learning, as may be used with the arrangement 100 of FIG. 1, in accordance with an example.

FIG. 7 shows a flow chart 700 illustrating a method of auto-labeling sensor data for ML. In one example, the operations illustrated in FIG. 6 are performed, at least in part, by executing instructions 802a (stored in the memory 802) by the one or more processors 804 of the computing device 800 of FIG. 8. In one example, operation 702 includes determining, for a platform, platform ownship data and platform velocity data. Operation 704 includes recording, from an electro-optical sensor aboard the platform, sensor data comprising a sensor image. Operation 706 includes receiving position data and velocity data for at least one intruder object. Operation 708 includes, based at least on the position data and velocity data for the intruder object and the platform ownship data and platform velocity data, determining a relative position and a relative velocity of the intruder object relative to the platform. Operation 710 includes, based at least on the relative position and a relative velocity of the intruder object and a field of view of the sensor, determining an expected position of the intruder object in the sensor image for a time interval corresponding to the sensor image. Operation 712 includes labeling the sensor image, wherein the labeling comprises annotating the sensor image with a region of interest and an object identification. Operation 714 includes training an artificial intelligence (AI) model using the labeled sensor image.

Figure 8:
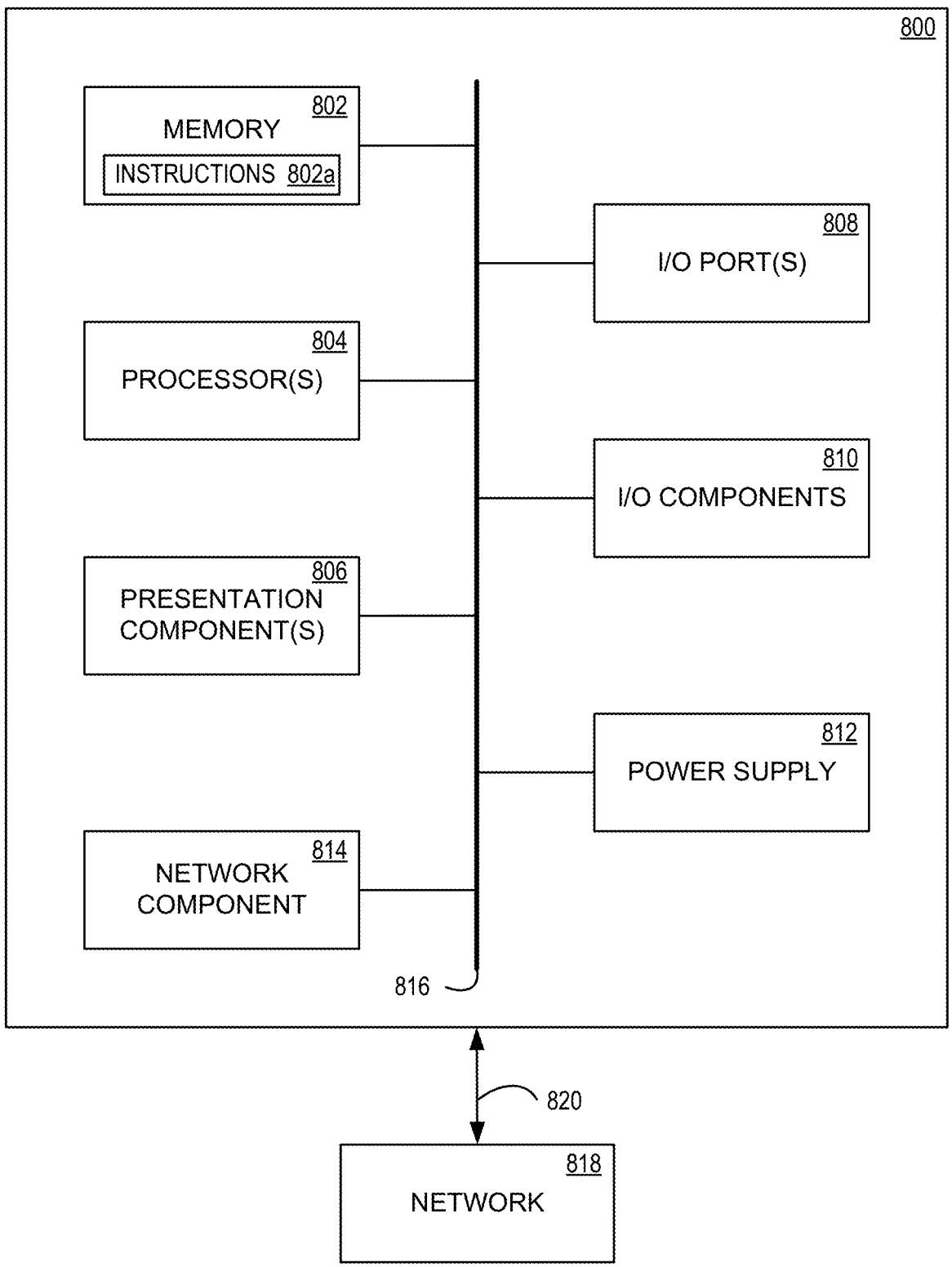
FIG. 8 is a block diagram of a computing device 800 suitable for implementing various aspects of the disclosure.

With reference now to FIG. 8, a block diagram of the computing device 800 suitable for implementing various aspects of the disclosure is described. In some examples, the computing device 800 includes one or more processors 804, one or more presentation components 806 and the memory 802. The disclosed implementations associated with the computing device 800 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 8 and the references herein to a "computing device." The disclosed implementations are also practiced in distributed computing environments, where tasks are performed by remote-processing devices that are linked through a communications network. Further, while the computing device 800 is depicted as a seemingly single device, in one example, multiple computing devices work together and share the depicted device resources. For instance, in one example, the memory 802 is distributed across multiple devices, the processor(s) 804 provided are housed on different devices, and so on.

In one example, the memory 802 includes any of the computer-readable media discussed herein. In one example, the memory 802 is used to store and access instructions 802a configured to carry out the various operations disclosed herein. In some examples, the memory 802 includes computer storage media in the form of volatile and/or nonvolatile memory, removable or non-removable memory, data disks in virtual environments, or a combination thereof. In one example, the processor(s) 804 includes any quantity of processing units that read data from various entities, such as the memory 802 or input/output (I/O) components 810. Specifically, the processor(s) 804 are programmed to execute computer-executable instructions for implementing aspects of the disclosure. In one example, the instructions are performed by the processor, by multiple processors within the computing device 800, or by a processor external to the computing device 800. In some examples, the processor(s) 804 are programmed to execute instructions such as those illustrated in the flow charts discussed below and depicted in the accompanying drawings.

The presentation component(s) 806 present data indications to an operator or to another device. In one example, presentation components 806 include a display device, speaker, printing component, vibrating component, etc. One skilled in the art will understand and appreciate that computer data is presented in a number of ways, such as visually in a graphical user interface (GUI), audibly through speakers, wirelessly between the computing device 800, across a wired connection, or in other ways. In one example, presentation component(s) 806 are not used when processes and operations are sufficiently automated that a need for human interaction is lessened or not needed. I/O ports 808 allow the computing device 800 to be logically coupled to other devices including the I/O components 810, some of which is built in. Implementations of the I/O components 810 include, for example but without limitation, a microphone, keyboard, mouse, joystick, game pad, satellite dish, scanner, printer, wireless device, etc.

The computing device 800 includes a bus 816 that directly or indirectly couples the following devices: the memory 802, the one or more processors 804, the one or more presentation components 806, the input/output (I/O) ports 808, the I/O components 810, a power supply 812, and a network component 814. The computing device 800 should not be interpreted as having any dependency or requirement related to any single component or combination of components illustrated therein. The bus 816 represents one or more busses (such as an address bus, data bus, or a combination thereof). Although the various blocks of FIG. 8 are shown with lines for the sake of clarity, some examples blur functionality over various different components described herein.

In some examples, the computing device 800 is communicatively coupled to a network 818 using the network component 814. In some examples, the network component 814 includes a network interface card and/or computer-executable instructions (e.g., a driver) for operating the network interface card. In one example, communication between the computing device 800 and other devices occur using any protocol or mechanism over a wired or wireless connection 820. In some examples, the network component 814 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 800, implementations of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other implementations of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 9:
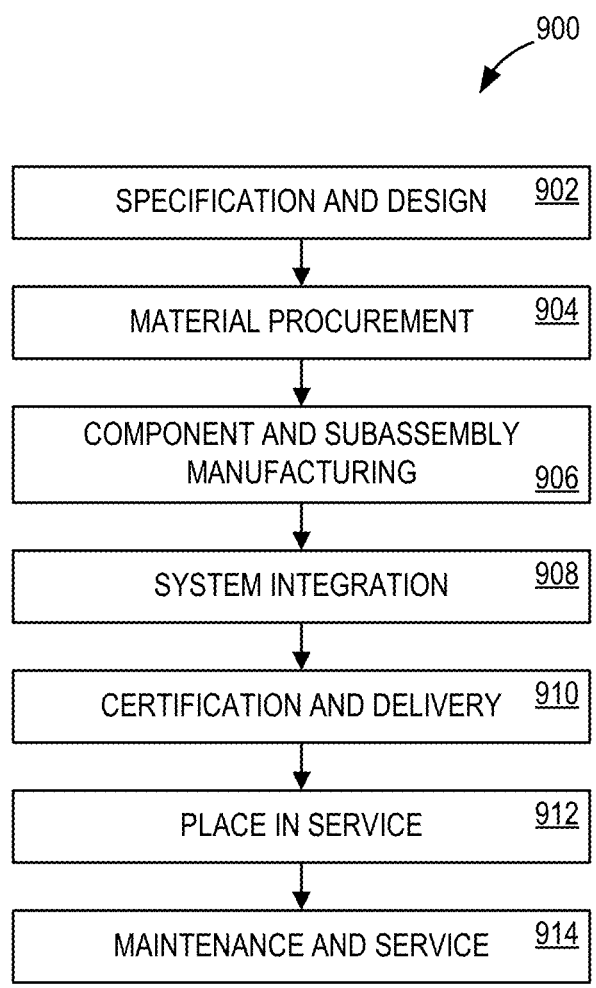
FIG. 9 is a block diagram of an apparatus production and service method 900 that advantageously employs various aspects of the disclosure.
Figure 10:
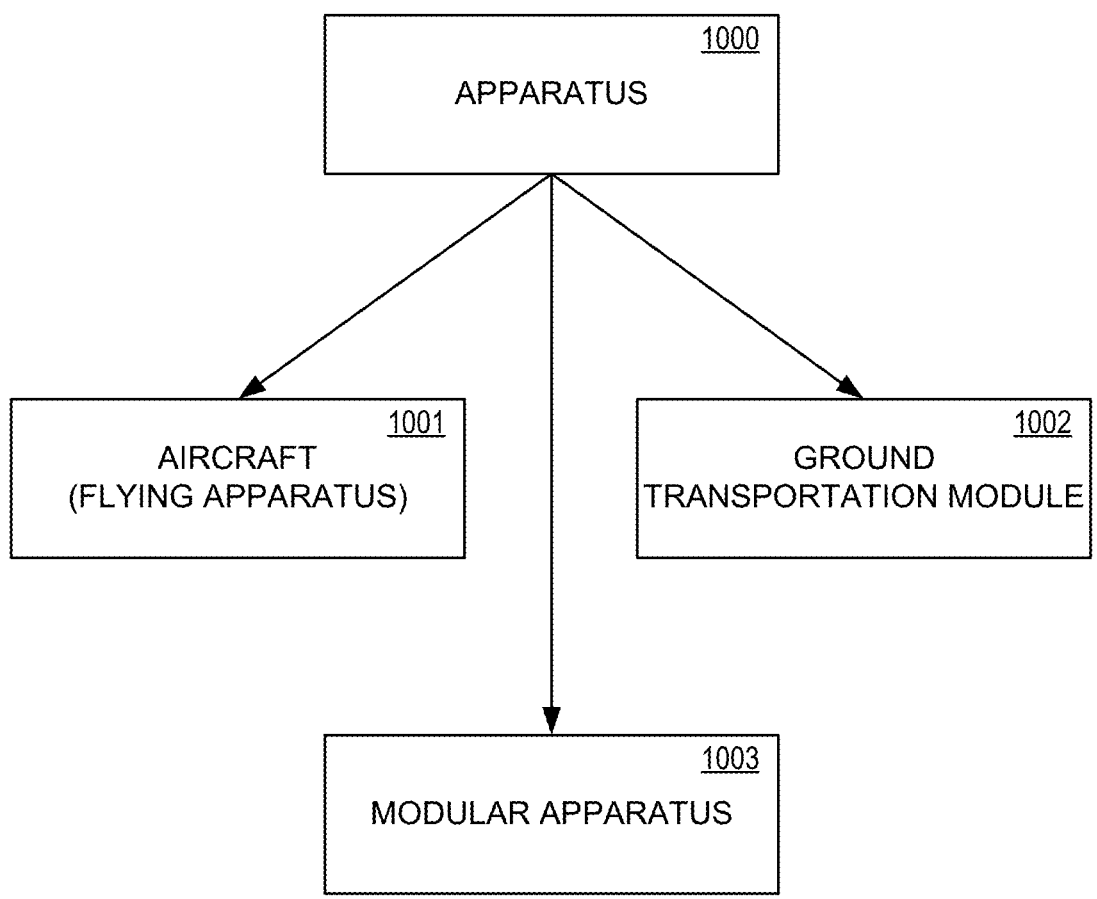
FIG. 10 is a block diagram of an apparatus 1000 for which various aspects of the disclosure may be advantageously employed.
Figure 11:
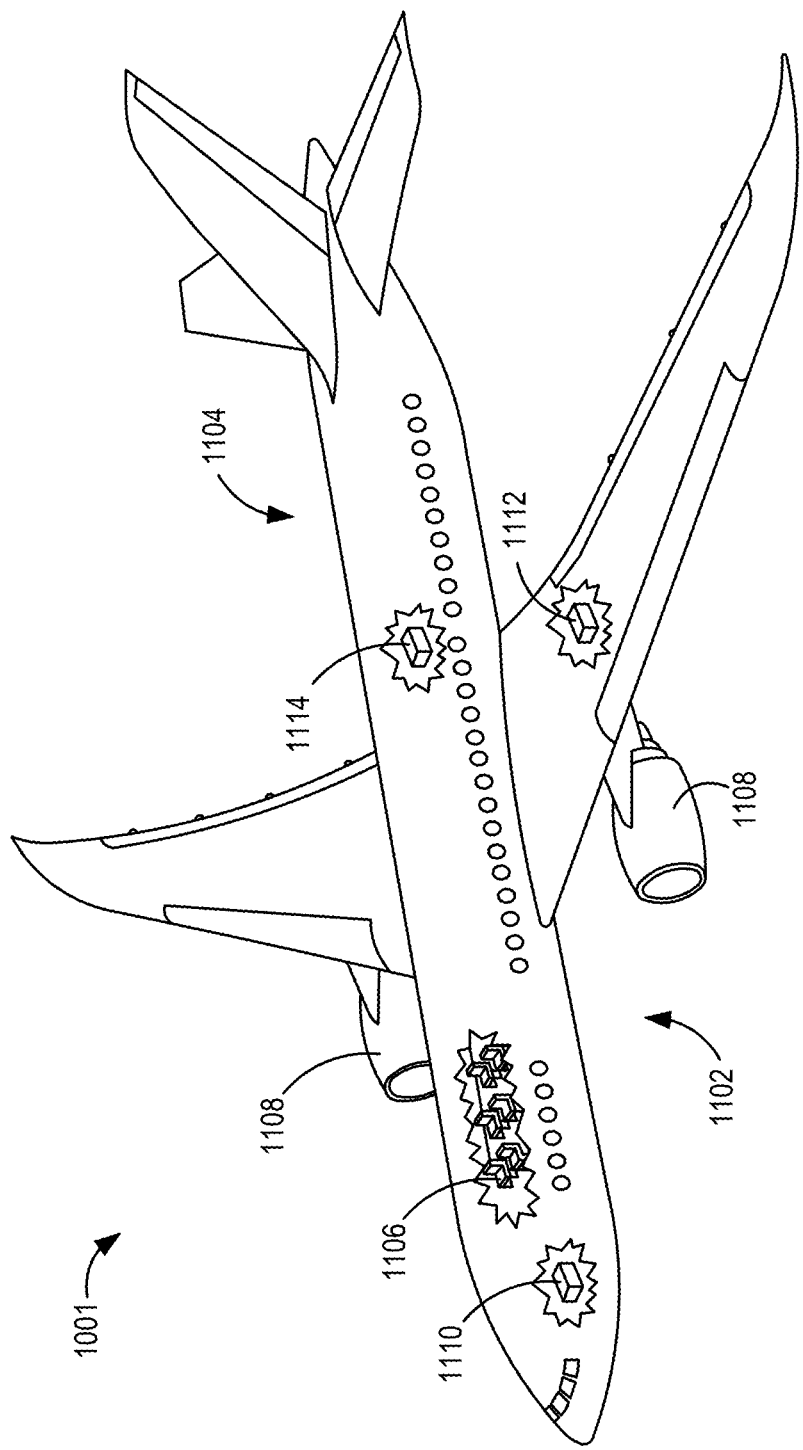
FIG. 11 is a schematic perspective view of a particular flying apparatus 1001.

Some examples of the disclosure are used in manufacturing and service applications as shown and described in relation to FIGS. 9-11. Thus, implementations of the disclosure are described in the context of an apparatus of manufacturing and service method 900 shown in FIG. 9 and apparatus 1000 shown in FIG. 10. In FIG. 10, a diagram illustrating an apparatus manufacturing and service method 900 is depicted in accordance with an implementation. In one example, during pre-production, the apparatus manufacturing and service method 900 includes specification and design 902 of the apparatus 1000 of FIG. 10 and material procurement 904. During production, component, and subassembly manufacturing 906 and system integration 908 of the apparatus 1000 of FIG. 10 takes place. Thereafter, the apparatus 1000 of FIG. 10 goes through certification and delivery 910 in order to be placed in service 912. While in service by a customer, the apparatus 1000 of FIG. 10 is scheduled for routine maintenance and service 914, which, in one example, includes modification, reconfiguration, refurbishment, and other maintenance or service subject to configuration management, described herein.

In one example, each of the processes of the apparatus manufacturing and service method 900 are performed or carried out by a system integrator, a third party, and/or an operator. In these examples, the operator is a customer. For the purposes of this description, a system integrator includes any number of apparatus manufacturers and major-system subcontractors; a third party includes any number of vendors, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 10, the apparatus 1000 is provided. As shown in FIG. 10, an example of the apparatus 1000 is a flying apparatus 1001, such as an aerospace vehicle, aircraft, air cargo, flying car, earth-orbiting satellite, planetary probe, deep space probe, solar probe, and the like. As also shown in FIG. 10, a further example of the apparatus 1000 is a ground transportation apparatus 1002, such as an automobile, a truck, heavy equipment, construction equipment, a boat, a ship, a submarine, and the like. A further example of the apparatus 1000 shown in FIG. 10 is a modular apparatus 1003 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

With reference now to FIG. 11, a more specific diagram of the flying apparatus 1001 is depicted in which an implementation of the disclosure is advantageously employed. In this example, the flying apparatus 1001 is an aircraft produced by the apparatus manufacturing and service method 900 in FIG. 9 and includes an airframe 1102 with a plurality of systems 1104 and an interior 1106. Implementations of the plurality of systems 1104 include one or more of a propulsion system 1108, an electrical system 1110, a hydraulic system 1112, and an environmental system 1114. However, other systems are also candidates for inclusion. Although an aerospace example is shown, different advantageous implementations are applied to other industries, such as the automotive industry, etc.

The implementations disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed implementations are practiced in a variety of system configurations, including personal computers, laptops, smart phones, mobile tablets, hand-held devices, consumer electronics, specialty computing devices, etc. The disclosed implementations are also practiced in distributed computing environments, where tasks are performed by remote-processing devices that are linked through a communications network.

An exemplary method of auto-labeling sensor data for ML comprises: determining, for a platform, platform ownship data; recording, from an electro-optical sensor aboard the platform, sensor data comprising a sensor image; receiving position data for at least one intruder object; based at least on the position data for the intruder object and the platform ownship data, determining a relative position and a relative velocity of the intruder object relative to the platform; based at least on the relative position and a relative velocity of the intruder object and a field of view of the sensor, determining an expected position of the intruder object in the sensor image for a time interval corresponding to the sensor image; labeling the sensor image, wherein the labeling comprises annotating the sensor image with a region of interest and an object identification; and training an AI model using the labeled sensor image.

Another exemplary method of auto-labeling sensor data for ML comprises: determining, for a platform, platform ownship data and platform velocity data; recording, from an electro-optical sensor aboard the platform, sensor data comprising a sensor image; receiving position data and velocity data for at least one intruder object; based at least on the position data and velocity data for the intruder object and the platform ownship data and platform velocity data, determining a relative position and a relative velocity of the intruder object relative to the platform; based at least on the relative position and a relative velocity of the intruder object and a field of view of the sensor, determining an expected position of the intruder object in the sensor image for a time interval corresponding to the sensor image; labeling the sensor image, wherein the labeling comprises annotating the sensor image with a region of interest and an object identification; and training an AI model using the labeled sensor image.

An exemplary system for auto-labeling sensor data for ML comprises: one or more processors; and a memory storing instructions that, when executed by the one or more processors, cause the one or more processors to perform operations comprising: determining, for a platform, platform ownship data; recording, from an electro-optical sensor aboard the platform, sensor data comprising a sensor image; receiving position data for at least one intruder object; based at least on the position data for the intruder object and the platform ownship data, determining a relative position and a relative velocity of the intruder object relative to the platform; based at least on the relative position and a relative velocity of the intruder object and a field of view of the sensor, determining an expected position of the intruder object in the sensor image for a time interval corresponding to the sensor image; labeling the sensor image, wherein the labeling comprises annotating the sensor image with a region of interest and an object identification; and training an AI model using the labeled sensor image.

Another exemplary system for auto-labeling sensor data for machine learning comprises: a flying platform; an electro-optical sensor aboard the platform operable to collect a sensor image; a receiver operable to receive position data and velocity data for at least one intruder object; a navigation component operable to determine platform ownship data and platform velocity data; a training image processing component operable to: determine a relative position and a relative velocity of the intruder object relative to the platform; determine an expected position of the intruder object in the collected sensor image for a time interval corresponding to the sensor image; and label the collected sensor image, wherein the labeling comprises annotating the collected sensor image with a region of interest and an object identification.

An exemplary computer program product comprises a computer usable medium having a computer readable program code embodied therein, the computer readable program code adapted to be executed to implement a method of auto-labeling sensor data for ML, the method comprising: determining, for a platform, platform ownship data; recording, from an electro-optical sensor aboard the platform, sensor data comprising a sensor image; receiving position data for at least one intruder object; based at least on the position data for the intruder object and the platform ownship data, determining a relative position and a relative velocity of the intruder object relative to the platform; based at least on the relative position and a relative velocity of the intruder object and a field of view of the sensor, determining an expected position of the intruder object in the sensor image for a time interval corresponding to the sensor image; labeling the sensor image, wherein the labeling comprises annotating the sensor image with a region of interest and an object identification; and training an AI model using the labeled sensor image.

Alternatively, or in addition to the other examples described herein, examples include any combination of the following:
- an optical camera, a LIDAR sensor, an infrared sensor, and a radar;
- recording, by a plurality of electro-optical sensors aboard the platform, sensor data comprising a plurality of sensor images;
- based at least on the intruder object's relative position and relative velocity, determining which sensor of the plurality of sensors has a view of the intruder object in the time interval;
- the position data for the intruder object comprises ADS-B data;
- determining the region of interest comprises, based at least on a distance from the platform to the intruder object, determining a bounding box within the sensor image;
- determining the region of interest comprises, based at least on accuracy of the ownship data and accuracy of the position data and velocity data for the intruder object, determining a size of the region of interest within the sensor image;
- autonomously navigating a UAV using the trained AI model in combination with a second sensor aboard the UAV, wherein the autonomously navigating comprises collision avoidance;
- a training component operable to train an AI model;
- a UAV operable to autonomously navigate with the AI model, wherein the autonomously navigating comprises collision avoidance;
- the platform ownship data has 6DOF;
- determining platform ownship data is based at least on GPS data;

determining platform ownship data is based at least on IMU data;
based at least on the intruder object's relative position and relative velocity, predicting which sensor of the plurality of sensors will have a view of the intruder object in a second time interval;
the position data for the intruder object is received from the intruder object;
the position data for the intruder object is received from a ground station;
the position data for the intruder object is received from another intruder object;
determining a pose of the intruder object;
determining the region of interest comprises, based at least on a size of the intruder object, determining a bounding box within the sensor image;
determining the region of interest comprises, based at least on a resolution of the sensor, determining a bounding box within the sensor image;
labeling the sensor image comprises annotating the sensor image with a pose of the intruder object;
labeling the sensor image comprises timestamping the sensor image;
the object identification includes a vehicle class;
labeling the sensor image comprises annotating a digital file comprising the sensor image;
labeling the sensor image comprises associating label data with metadata for the sensor image;
the AI model comprises a neural network;
the AI model comprises a CNN;
cropping the labeled sensor image to the region of interest as part of a post-processing operation;
based at least on post-processing the labeled sensor image, relabeling the labeled sensor image;
autonomously navigating a UAV using the trained AI model in combination with a second sensor aboard the UAV and position data for a second intruder object, wherein the autonomously navigating comprises collision avoidance;
prior to training the AI model, validating the labeled sensor image;

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of auto-labeling sensor data for machine learning (ML), the method comprising:
   determining, for a platform, platform ownship data;
   recording, from an electro-optical sensor aboard the platform, sensor data comprising a plurality of sensor images;
   receiving position data for at least one intruder object;
   based at least on the position data for the at least one intruder object and the platform ownship data, determining a relative position and a relative velocity of the at least one intruder object relative to the platform;
   for each respective sensor image of the plurality of sensor images:
   based at least on the relative position and the relative velocity of the at least one intruder object and a field of view of the sensor, determining an expected position of the at least one intruder object in the respective sensor image for a time interval corresponding to the respective sensor image; and
   labeling the respective sensor image, wherein the labeling comprises annotating the respective sensor image with a region of interest and an object identification, wherein the region of interest is a region in the sensor image likely to contain a view of the at least one intruder object and is determined based on the expected position of the at least one intruder object; and
   training an artificial intelligence (AI) model using the labeled sensor images to produce a trained AI model for collision avoidance.

2. The method of claim 1, wherein the sensor comprises a sensor type selected from a list consisting of: an optical camera, a light detection and ranging (LIDAR) sensor, an infrared sensor, and a radio detection and ranging (radar) sensor.

3. The method of claim 1, further comprising:
   recording sensor data from a plurality of electro-optical sensors aboard the platform; and
   based at least on the relative position and relative velocity of the at least one intruder object, determining which sensor of the plurality of sensors has a view of the at least one intruder object in the time interval.

4. The method of claim 1, wherein the position data for the at least one intruder object comprises automatic dependent surveillance-broadcast (ADS-B) data.

5. The method of claim 1, wherein determining the region of interest comprises, based at least on a distance from the platform to the at least one intruder object, determining a bounding box within the sensor image.

6. The method of claim 1, wherein the object identification includes a vehicle class.

7. The method of claim 1, wherein determining the region of interest comprises, based at least on accuracy of the ownship data and accuracy of the position data or velocity data for the at least one intruder object, determining a size of the region of interest within the sensor image.

8. The method of claim 1, further comprising:
   autonomously navigating an unmanned aerial vehicle (UAV) using the trained AI model in combination with a second sensor aboard the UAV, wherein the autonomously navigating comprises collision avoidance.

9. A system for auto-labeling sensor data for machine learning (ML), the system comprising:
   one or more processors; and
   a memory storing instructions that, when executed by the one or more processors, cause the one or more processors to perform operations comprising:
   determining, for a platform, platform ownship data;
   recording, from an electro-optical sensor aboard the platform, sensor data comprising a plurality of sensor images;
   receiving position data for at least one intruder object;

based at least on the position data for the at least one intruder object and the platform ownship data, determining a relative position and a relative velocity of the at least one intruder object relative to the platform;

for each respective sensor image of the plurality of sensor images:
  based at least on the relative position and the relative velocity of the at least one intruder object and a field of view of the sensor, determining an expected position of the at least one intruder object in the respective sensor image for a time interval corresponding to the respective sensor image; and
  labeling the respective sensor image, wherein the labeling comprises annotating the respective sensor image with a region of interest and an object identification, wherein the region of interest is a region in the sensor image likely to contain a view of the at least one intruder object and is determined based on the expected position of the at least one intruder object; and training an artificial intelligence (AI) model using the labeled sensor images to produce a trained AI model for collision avoidance.

10. The system of claim 9, wherein the sensor comprises a sensor type selected from a list consisting of: an optical camera, a light detection and ranging (LIDAR) sensor, an infrared sensor, and a radio detection and ranging (radar) sensor.

11. The system of claim 9, wherein the operations further comprise:
  recording sensor data from a plurality of electro-optical sensors aboard the platform; and
  based at least on the relative position and relative velocity of the at least one intruder object, determining which sensor of the plurality of sensors has a view of the at least one intruder object in the time interval.

12. The system of claim 9, wherein the position data for the at least one intruder object comprises automatic dependent surveillance-broadcast (ADS-B) data.

13. The system of claim 9, wherein determining the region of interest comprises, based at least on a distance from the platform to the at least one intruder object, determining a bounding box within the sensor image.

14. The system of claim 9, wherein the object identification includes a vehicle class.

15. The system of claim 9, wherein determining the region of interest comprises, based at least on accuracy of the ownship data and accuracy of the position data or velocity data for the at least one intruder object, determining a size of the region of interest within the sensor image.

16. The system of claim 9, wherein the operations further comprise:
  autonomously navigating an unmanned aerial vehicle (UAV) using the trained AI model in combination with a second sensor aboard the UAV, wherein the autonomously navigating comprises collision avoidance.

17. A computer program product, comprising a computer usable medium having a computer readable program code embodied therein, the computer readable program code adapted to be executed to implement a method of auto-labeling sensor data for machine learning (ML), the method comprising:
  determining, for a platform, platform ownship data;
  recording, from an electro-optical sensor aboard the platform, sensor data comprising a plurality of sensor images;
  receiving position data for at least one intruder object;
  based at least on the position data for the at least one intruder object and the platform ownship data, determining a relative position and a relative velocity of the at least one intruder object relative to the platform;
  for each respective sensor image of the plurality of sensor images:
    based at least on the relative position and the relative velocity of the at least one intruder object and a field of view of the sensor, determining an expected position of the at least one intruder object in the respective sensor image for a time interval corresponding to the respective sensor image; and
    labeling the respective sensor image, wherein the labeling comprises annotating the respective sensor image with a region of interest and an object identification, wherein the region of interest is a region in the sensor image likely to contain a view of the at least one intruder object and is determined based on the expected position of the at least one intruder object; and
  training an artificial intelligence (AI) model using the labeled sensor images to produce a trained AI model for collision avoidance.

18. The computer program product of claim 17, wherein the sensor comprises a sensor type selected from a list consisting of: an optical camera, a light detection and ranging (LIDAR) sensor, an infrared sensor, and a radio detection and ranging (radar) sensor.

19. The computer program product of claim 17, wherein the method further comprises:
  recording sensor data from a plurality of electro-optical sensors aboard the platform; and
  based at least on the relative position and relative velocity of the at least one intruder object, determining which sensor of the plurality of sensors has a view of the at least one intruder object in the time interval.

20. The computer program product of claim 17, wherein the position data for the at least one intruder object comprises automatic dependent surveillance-broadcast (ADS-B) data.

21. The computer program product of claim 17, wherein determining the region of interest comprises, based at least on a distance from the platform to the at least one intruder object, determining a bounding box within the sensor image.

22. The computer program product of claim 17, wherein determining the region of interest comprises, based at least on accuracy of the ownship data and accuracy of the position data or velocity data for the at least one intruder object, determining a size of the region of interest within the sensor image.

* * * * *